US012411711B2

(12) United States Patent
Basu et al.

(10) Patent No.: US 12,411,711 B2
(45) Date of Patent: *Sep. 9, 2025

(54) ENFORCING CENTRAL PROCESSING UNIT QUALITY OF SERVICE GUARANTEES WHEN SERVICING ACCELERATOR REQUESTS

(71) Applicant: Advanced Micro Devices, Inc., Santa Clara, CA (US)

(72) Inventors: Arkaprava Basu, Bangalore (IN); Joseph Lee Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,214

(22) Filed: Mar. 1, 2022

(65) Prior Publication Data

US 2022/0269535 A1 Aug. 25, 2022

Related U.S. Application Data

(63) Continuation of application No. 15/954,382, filed on Apr. 16, 2018, now Pat. No. 11,275,613.

(51) Int. Cl.
*G06F 9/46* (2006.01)
*G06F 9/48* (2006.01)

(52) U.S. Cl.
CPC ............ *G06F 9/4887* (2013.01); *G06F 9/466* (2013.01)

(58) Field of Classification Search
CPC ................................ G06F 9/4887; G06F 9/466
See application file for complete search history.

(56) References Cited

U.S. PATENT DOCUMENTS 8,286,139 B2    10/2012   Jones et al.
11,275,613 B2    3/2022   Basu et al.
(Continued)

FOREIGN PATENT DOCUMENTS

JP        H1115800 A     1/1999
JP        11259311 A     9/1999
(Continued)

OTHER PUBLICATIONS

Office Action in Korean Patent Application No. 10-2020-7032966, mailed Jun. 23, 2022, 10 pages.
(Continued)

*Primary Examiner* — Diem K Cao
(74) *Attorney, Agent, or Firm* — Kowert, Hood, Munyon, Rankin & Goetzel, P.C.; Rory D. Rankin

(57) ABSTRACT

Systems, apparatuses, and methods for enforcing processor quality of service guarantees when servicing system service requests (SSRs) are disclosed. A system includes a first processor executing an operating system and a second processor executing an application which generates SSRs for the first processor to service. The first processor monitors the number of cycles spent servicing SSRs over a previous time interval, and if this number of cycles is above a threshold, the first processor starts delaying the servicing of subsequent SSRs. In one implementation, if the previous delay was non-zero, the first processor increases the delay used in the servicing of subsequent SSRs. If the number of cycles is less than or equal to the threshold, then the first processor services SSRs without delay. As the delay is increased, the second processor begins to stall and its SSR generation rate falls, reducing the load on the first processor.

17 Claims, 7 Drawing Sheets

(56) References Cited

U.S. PATENT DOCUMENTS

| | | | |
|---|---|---|---|
| 2006/0161920 A1 | 7/2006 | An et al. | |
| 2012/0047515 A1 | 2/2012 | Kanetomo | |
| 2015/0046676 A1* | 2/2015 | Archibald | G06F 9/5083 |
| | | | 712/28 |
| 2015/0234677 A1 | 8/2015 | Bartley et al. | |
| 2017/0300357 A1 | 10/2017 | Aberg et al. | |
| 2018/0069767 A1 | 3/2018 | Basu et al. | |

FOREIGN PATENT DOCUMENTS

| | | |
|---|---|---|
| JP | 2008269152 A | 11/2008 |
| WO | 03063002 A1 | 7/2003 |

OTHER PUBLICATIONS

First Examination Report in Indian Patent Application No. 202017046634, mailed Jul. 21, 2022, 5 pages.

Non-Final Office Action in Japanese Patent Application No. 2020-557323, mailed Feb. 1, 2022, 11 pages.

Haring, Ruud, "The Blue Gene/Q Compute Chip", Hot Chips: A Symposium on High Performance Chips, Aug. 18, 2011, 20 pages, https://www.hotchips.org/wp-content/uploads/hc_archives/hc23/HC23.18.1-manycore/HC23.18.121.BlueGene-IBM_BQC_HC23_20110818.pdf. [Retrieved May 9, 2018].

Herbert et al., "Scaling in the Linux Networking Stack", 6 pages, https://www.kernel.org/doc/Documentation/networking/scaling.txt. [Retrieved May 9, 2018].

"Interrupt Moderation Using Intel® GbE Controllers", Intel Corporation, Apr. 2007, 19 pages, Revision 1.2, https://www.intel.co.id/content/dam/doc/application-note/gbe-controllers-interrupt-moderation-appl-note.pdf. [Retrieved May 9, 2018].

Leon et al., System Noise Revisited: Enabling Application Scalability and Reproducibility with Simultaneous Multithreading, Proceedings of the International Parallel and Distributed Processing Symposium, May 23, 2016, 12 pages, https://e-reports-ext.llnl.gov/pdf/791809.pdf. [Retrieved May 9, 2018].

Mogul et al., "Eliminating Receive Livelock in an Interrupt-driven Kernel". Proceedings of the USENIX Annual Technical Conference, Jan. 1996, 13 pages, https://pdos.csail.mit.edu/6.828/2008/readings/mogul96usenix.pdf. [Retrieved May 9, 2018].

Mogul, Jeffrey C., "TCP Offload is a Dumb Idea Whose Time Has Come". Proceedings of the 9th conference on Hot Topics in Operating Systems, May 18, 2003, 6 pages, https://pdfs.semanticscholar.org/70cd/ec19f689049d85d9b421bdfeca19de4ca3a3.pdf. [Retrieved May 9, 2018].

International Search Report and Written Opinion in International Application No. PCT/US2019/017933, mailed May 14, 2019, 14 pages.

Cheng et al., "vBalance: Using Interrupt Load Balance to Improve I/O Performance for SMP Virtual Machines", Proceedings of the Third ACM Symposium on Cloud Computing, SOCC'12, Oct. 14-17, 2012, 14 pages.

Stefanov et al., "Study of CPU Usage Data Properties for Using in Performance Monitoring", Russian Supercomputing Days 2016, Jan. 1, 2016, pp. 36-40, http:/russianscdays.org/files/pdf16/36.pdf. [Retrieved May 2, 2019].

McDougall, Richard, "Chapter 3.11: Interrupts", Solaris™ Internals: Solaris 10 and OpenSolaris Kernel Architecture, Jul. 10, 2006, 7 pages, Second Edition, Prentice Hall.

"Exponential backoff", Wikipedia.org, Mar. 13, 2018, 3 pages, https://en.wikipedia.org/w/index.php?title=Exponential_backoff&oldid=830252246. [Retrieved May 2, 2019].

Missimer et al. "Mixed-Criticality Scheduling with I/O", 28th Euromicro Conference on Real-Time Systems, Mar. 12, 2016, 13 pages, https://ieeexplore.ieee.org/ie17/7557819/7557852/07557874.pdf. [Retrieved May 2, 2019].

Soares et al., "FlexSC: Flexible System Call Scheduling with Exception-Less System Calls", OSDI'10: Proceedings of the 9th USENIX conference on Operating systems design and implementation, Oct. 2010, 14 pages.

Grabiec, Tomasz, "Reducing latency spikes by tuning the CPU scheduler", ScyllaDB, Jun. 10, 2016, 19 pages, https://www.scylladb.com/2016/06/10/read-latency-and-scylla-jmx-process/.

* cited by examiner

ENFORCING CENTRAL PROCESSING UNIT QUALITY OF SERVICE GUARANTEES WHEN SERVICING ACCELERATOR REQUESTS

CROSS REFERENCE TO RELATED APPLICATIONS

This application is a continuation of U.S. patent application Ser. No. 15/954,382, now U.S. Pat. No. 11,275,613, entitled "ENFORCING CENTRAL PROCESSING UNIT QUALITY OF SERVICE GUARANTEES WHEN SERVICING ACCELERATOR REQUESTS", filed Apr. 16, 2018, the entirety of which is incorporated herein by reference.

GOVERNMENT LICENSE RIGHTS

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

Modern system on chips (SoCs) often integrate large numbers of different types of components on a single chip or on multi-chip modules. For example, a typical SoC includes a main processor (e.g., a central processing unit (CPU)) along with accelerators such as integrated graphics processing units (GPUs) and media engines. As these accelerators become progressively more capable, they are expected to directly invoke complex operating system (OS) services like page faults, file system accesses, or network accesses. However, the OS does not run on the accelerators. Therefore, these accelerator system service requests (SSRs) need to be serviced by the OS running on the CPU. These accelerator SSRs severely interfere with contemporaneous CPU applications. Often times, significant performance and energy efficiency degradation in contemporaneous CPU applications occur due to destructive interference from the servicing of SSRs from accelerators.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
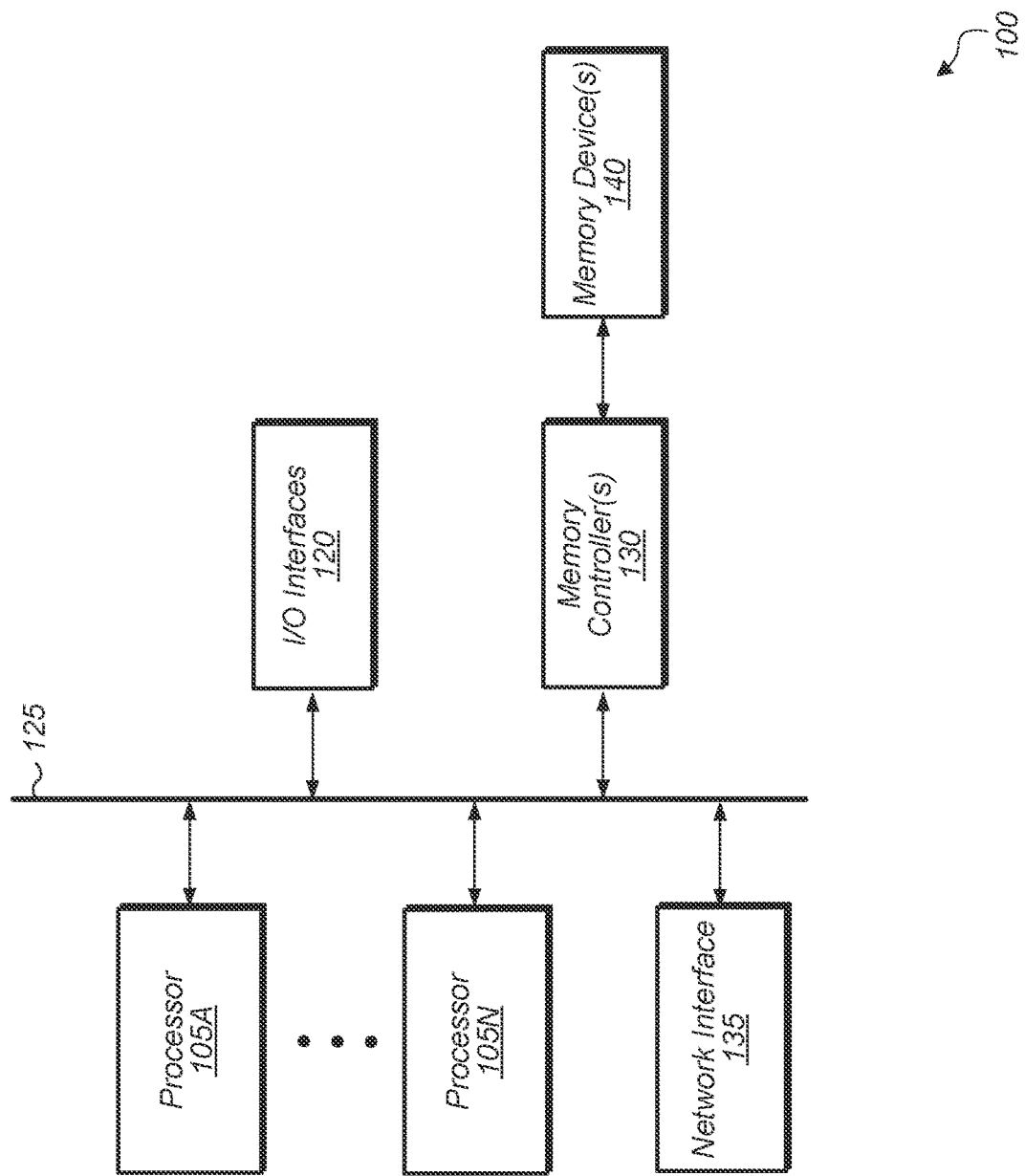
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for enforcing central processing unit (CPU) quality of service (QoS) guarantees in the face of accelerator system service requests are disclosed herein. In one implementation, a system includes at least a CPU and an accelerator. The accelerator is a graphics processing unit (GPU) or other type of processing unit. In some implementations, the system includes multiple accelerators. In one implementation, the CPU executes an operating system (OS) and the accelerator executes an application. When the accelerator application needs assistance from the OS, the accelerator application sends a system service request (SSR) to the CPU for servicing. For certain applications, the accelerator sends a large number of SSRs to the CPU for servicing. The CPU is configured to monitor the amount of time that the OS spends in servicing SSRs from the accelerator(s). In various implementations, the amount of time is measured in terms of cycles. In other implementations, a different measure of time is used. For ease of discussion, tracking of time in terms of cycles will be used herein. In one implementation, the OS routines that are engaged in servicing SSRs track their CPU usage cycles.

In one implementation, a kernel background thread wakes up periodically to determine if the number of CPU cycles spent servicing SSRs in a previous time interval is greater than a specified limit. In one implementation, the limit is specified by an administrator. In another implementation, a software application dynamically adjusts the value of the limit based on operating conditions. In one implementation, a kernel worker thread adds an adjustable amount of delay to the processing of a newly received SSR, with the delay calculated based on the CPU overhead (e.g., percentage of CPU time) spent servicing SSRs over the previous time interval. For example, in one implementation, at the start of processing an SSR, the kernel worker thread checks if the percentage of CPU time spent handling SSRs is above a specified threshold. The kernel worker thread performs this check using the information gathered by the kernel background thread. If the percentage of CPU time spent handling SSRs is below the specified threshold, the kernel worker thread sets the desired delay to zero and continues to process SSRs immediately. Otherwise, if the percentage of CPU time spent handling SSRs is greater than the specified threshold, then the kernel worker thread sets the amount of delay in processing SSRs based on an exponential back-off. For example, in one implementation, if the desired delay was previously more than zero, the kernel worker thread increases the delay to a value greater than the previous delay value. For example, in various implementations the new delay value may be a multiple of the previous value (e.g., 2×, 3×, etc.). In other implementations, the new delay value may be a greater value that is not a multiple of the previous delay value. Otherwise, if the desired delay was previously zero, then the kernel worker thread sets the new delay to an initial, nominal value (e.g., 10 μsec). The processing of the SSR is then delayed by this amount.

As the delay is increased, the accelerator(s) will begin to stall and the SSR rate will eventually drop. When the CPU overhead falls below the set limit, the SSRs will once again be serviced without any artificial delay. In addition, in one implementation, servicing of accelerator SSRs is automatically throttled only when this servicing interferes with the CPU application(s). In this implementation, if the CPU is otherwise idle, the SSRs are serviced as quickly as possible even if the CPU overhead is above the limit. In one implementation, this check is implemented by querying the OS scheduler about other processes that are waiting in the runlist.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105N is an accelerator engine. For example, in one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple accelerator engines. These multiple accelerator engines are configured to send system service requests (SSRs) to processor 105A for processing. Processor 105A is configured to monitor the overhead associated with processing these SSRs. Depending on the implementation, processor 105A monitors the overhead in terms of a number of CPU cycles, a percentage of total CPU cycles, an amount of time, and/or based on other metrics. If the overhead over a previous time interval exceeds a threshold, processor 105A delays processing of SSRs and/or otherwise decreases the amount of resources devoted to processing SSRs.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
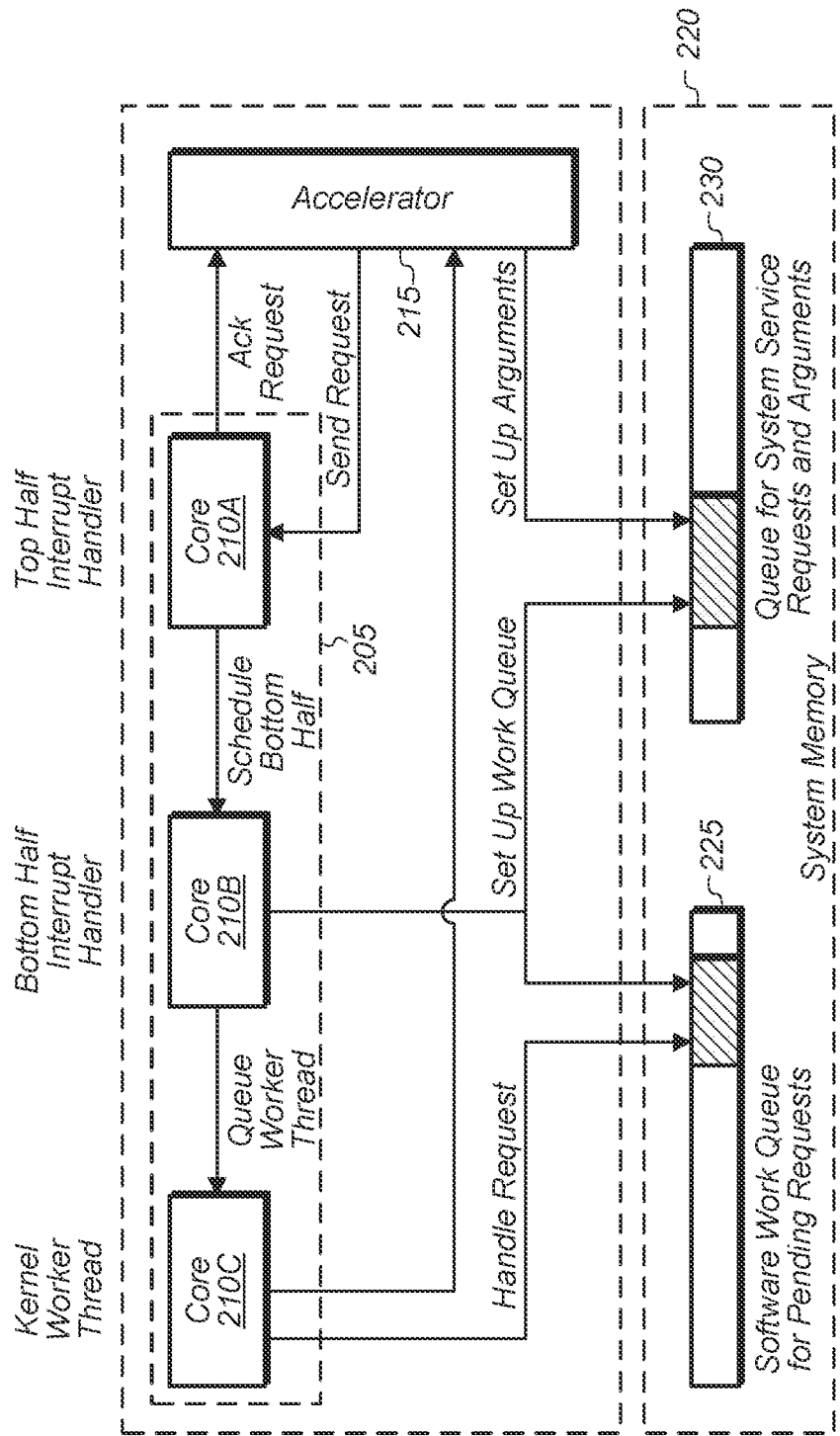
FIG. 2 is a block diagram of one implementation of a computing system with a CPU and an accelerator.

Turning now to FIG. 2, a block diagram of one implementation of a system 200 with a CPU and an accelerator is shown. CPU 205 is coupled to accelerator 215, with both CPU 205 and accelerator 215 coupled to system memory 220. CPU 205 includes cores 210A-C, which are representative of any number of cores. Cores 210A-C are also be referred to herein as "execution units". One example of the flow of CPU 205 handling system service requests (SSRs) generated by accelerator 215 is shown in FIG. 2. Accelerator 215 starts by setting up arguments in queue 230 in system memory 220. Then, accelerator 215 sends a SSR to core 210A. In one implementation, core 210A executes a top half interrupt handler which schedules a bottom half interrupt handler on core 210B. The bottom half interrupt handler sets up a work queue in software work queue 225 and queue 230 and queues a kernel worker thread on core 210C. The kernel worker thread handles the SSR by accessing software work queue 225. Then, the kernel worker thread processes the SSR and generates and conveys a system service response to accelerator 215.

It should be understood that FIG. 2 illustrates one example of handling accelerator SSRs in accordance with one implementation. In other implementations, other schemes for handling accelerator SSRs that include other steps and/or other orders of steps are used. One of the disadvantages of the approach illustrated in FIG. 2 is that CPU 205 lacks the ability to throttle requests generated by accelerator 215 if the number of requests starts to impact performance of CPU 205. For example, in another implementation, CPU 205 is coupled to multiple accelerators, each of which generates a large number of SSRs in a short period of time.

Figure 3:
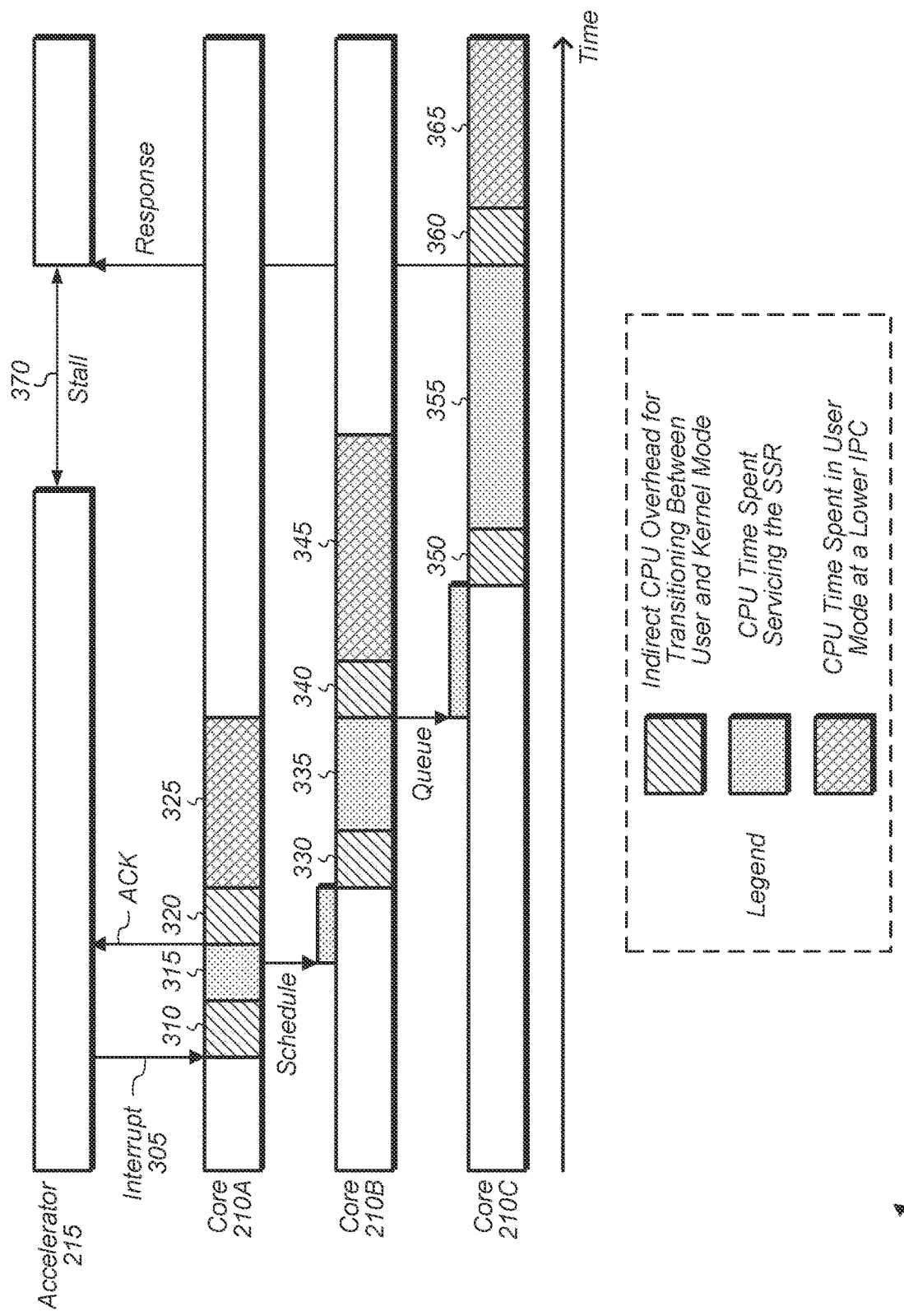
FIG. 3 is a timing diagram illustrating the overhead associated with processing accelerator SSRs in accordance with one implementation.

Referring now to FIG. 3, one implementation of a timing diagram 300 illustrating the overhead associated with processing accelerator SSRs is shown. The timing diagram 300 of FIG. 3 corresponds to the steps shown in FIG. 2 for CPU 205 processing the SSR generated by accelerator 215. The top row of timing diagram 300 illustrates the timing of events for accelerator 215. In one implementation, accelerator 215 generates interrupt 305 which is processed by core 210A. Area 310 represents an indirect CPU overhead for CPU 205 to spend transitioning between user and kernel mode. Area 315 represents the time spent scheduling the bottom half interrupt handler. After scheduling the bottom half interrupt handler, area 320 represents another indirect CPU overhead for the transition between kernel and user mode. Area 325 represents time spent in user mode running at a lower instruction per cycle (IPC) rate due to the kernel's use of various resources of the processor, such as cache and translation lookaside buffer (TLB) space, in the processing of the SSR. This ends up reducing the resources available for other CPU tasks. In one implementation, when a worker thread calculates the CPU overhead spent servicing SSRs, the worker thread includes the indirect CPU overhead associated with transitioning between user and kernel mode and time spent in user mode running at a lower IPC rate in the calculation of the overhead.

For the row shown for core 210B, area 330 represents an indirect CPU overhead which is spent transitioning from user to kernel mode. Area 335 represents the time spent executing the bottom half interrupt handler. Area 340 represents another indirect CPU overhead which is spent transitioning from kernel to user mode. Area 345 represents an indirect CPU overhead spent in user mode running at a lower IPC rate due to the kernel's use of various resources of the processor in the processing of the SSR.

The bottom half interrupt handler initiates the kernel worker thread on core 210C. Area 350 represents an indirect CPU overhead which is spent transitioning from user to kernel mode. Area 355 represents the time spent by the kernel worker thread servicing the accelerator's SSR. After servicing the accelerator's SSR, the kernel worker thread experiences an indirect overhead transitioning from kernel to user mode (represented by area 360) and time spent in user mode running at a lower IPC rate (represented by area 365).

In addition to the time spent by CPU 205 in processing the SSR, accelerator 215 experiences a stall due to the latency of CPU 205 handling the SSR as shown by duration 370. While accelerator 215 has latency hiding capabilities, the latency of CPU 205 handling the SSR might be longer than is able to be hidden by accelerator 215. As is seen by the events represented by timing diagram 300, accelerator SSRs directly and indirectly affect CPU performance, and the CPU's handling of SSRs also affects the accelerator's performance.

Figure 4:
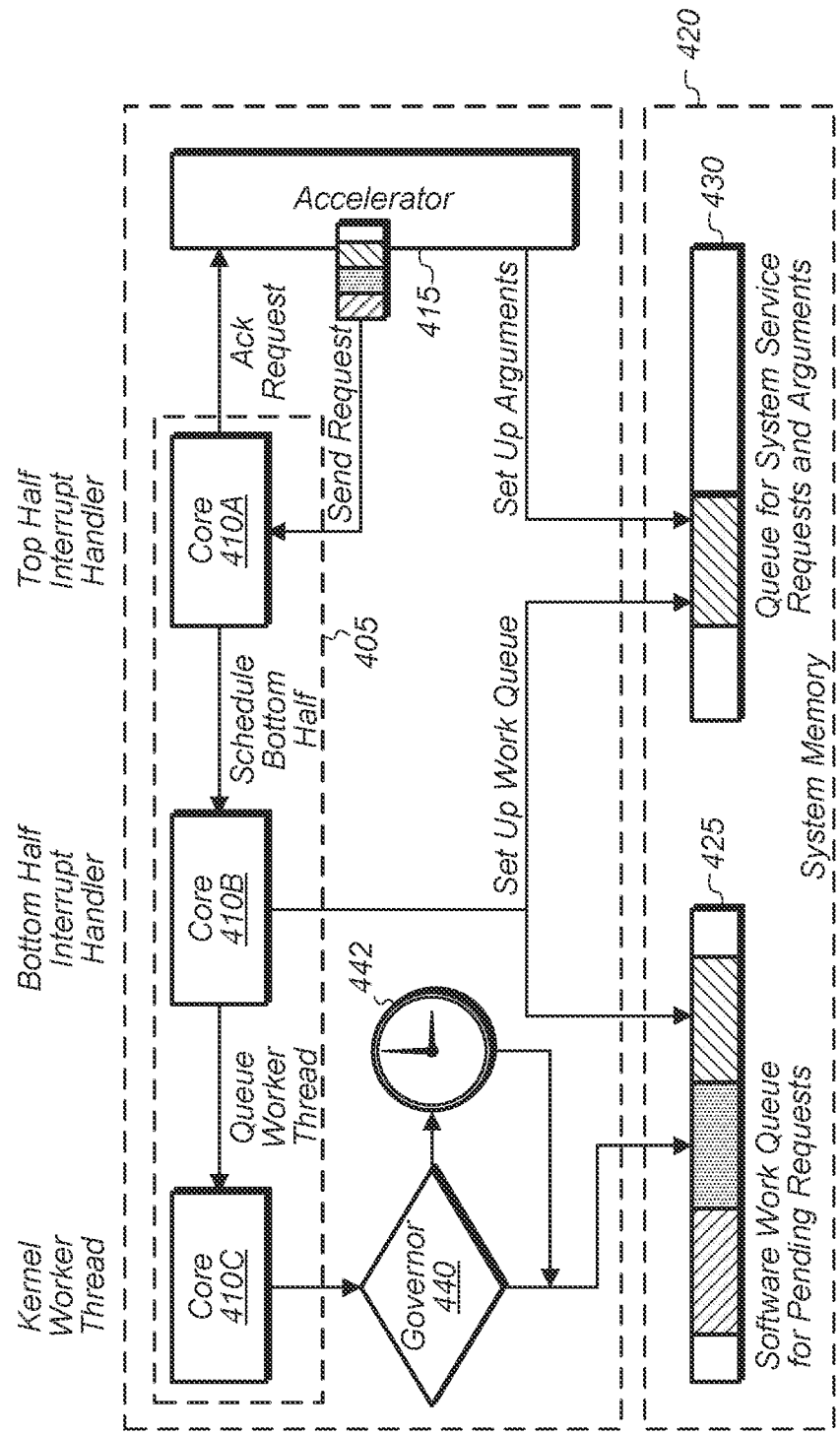
FIG. 4 block diagram of another implementation of a scheme for handling accelerator SSRs.

Turning now to FIG. 4, a block diagram of another implementation of a scheme for handling accelerator SSRs is shown. Similar to the scheme shown in FIG. 2, CPU 405 is coupled to accelerator 415, with both CPU 405 and accelerator 415 coupled to system memory 420. CPU 405 includes cores 410A-C, which are representative of any number of cores. Accelerator 415 starts by setting up arguments in queue 430 in system memory 420. Then, accelerator 415 sends a SSR to core 410A. In one implementation, core 410A executes a top half interrupt handler which schedules a bottom half interrupt handler on core 410B. The bottom half interrupt handler sets up a work queue in software work queue 425 and queue 430 and queues a kernel worker thread on core 410C. However, in contrast to the scheme illustrated in FIG. 2, governor 440 determines how long to delay the kernel worker thread prior to the kernel worker thread servicing the SSR. In one implementation, governor 440 uses counter 442 to implement the delay. Counter 442 may be implemented using a count of clock cycles or any other suitable measure of time. After this delay, the kernel worker thread services the SSR and generates and conveys a system service response to accelerator 415. Depending on the implementation, governor 440 is implemented as an OS thread, as part of a driver, or as any suitable combination of hardware and/or software.

In one implementation, the SSR rate is moderated by delaying processing of already-arrived SSRs when the amount of CPU time spent processing SSRs is higher than a desired rate. This delay will eventually back-pressure accelerator 415 to stop generating new SSR requests. By adding a delay to the servicing SSRs instead of rejecting accelerator SSRs outright, this scheme is implemented without requiring any modification to how accelerators generate SSRs. In one implementation, governor 440 decides whether to delay processing of SSRs based on the amount of CPU time spent processing SSRs. In one implementation, governor 440 is implemented as a kernel worker thread.

In one implementation, all OS routines involved in servicing SSRs track their CPU cycles. This information is then used by a kernel background thread that wakes up periodically (e.g., every 10 μs) to calculate if the number of CPU cycles spent on servicing SSRs in the period is over the specified limit. In one implementation, the limit is specified by an administrator. In another implementation, the limit is dynamically set by the OS based on characteristics of the applications running at any given time.

Additionally, a kernel worker thread processes SSRs as shown in FIG. 4. At the start of processing an SSR, the worker thread checks if the CPU cycles spent processing SSRs is above the specified threshold. The worker thread utilizes the information gathered by the background thread to determine if the CPU cycles spent processing SSRs is above the specified threshold. If the number of CPU cycles spent processing SSR is less than or equal to the specified threshold, then the worker thread sets the desired delay to zero and continues to process SSRs immediately. Otherwise, if the CPU time spent processing SSRs is above the specified threshold, then the worker thread determines an amount of delay to add to the processing of SSRs. The worker thread then waits for this amount of delay prior to processing a subsequent SSR. By delaying the servicing of SSRs, governor 440 causes accelerator 415 to throttle its SSR generation rate. For example, accelerator 415 typically has limited space to store the state associated with each SSR. Hence, delaying SSRs results in accelerator 415 reducing its rate of SSR generation.

In one implementation, the worker thread uses an exponential backoff scheme to set the amount of delay for processing SSRs. One example of the worker thread using an exponential backoff scheme is described in more detail below in the discussion regarding method 500 of FIG. 5. For example, in one implementation, if the desired delay was previously more than zero, the worker thread increases the delay. Otherwise, if the desired delay was previously zero, the worker thread sets the delay to an initial value (e.g., 5 μs). The processing of the SSR is then delayed by the amount determined by the worker thread. As the delay is increased, accelerator 415 begins to stall and the SSR generation rate eventually drops. When the overhead falls below the threshold, the SSRs will once again be serviced without any artificial delay.

In other implementations, governor 440 uses other techniques to implement the QoS guarantee mechanism. For example, in another implementation, governor 440 maintains a lookup table to determine how much delay to add to the servicing of a SSR. In this implementation, when the number of CPU cycles spent servicing SSRs is calculated, this number is used as the input to the lookup table to retrieve a corresponding delay value to add to the servicing of a subsequent SSR. In other implementations, governor 440 implements other suitable types of QoS guarantee mechanisms.

Figure 5:
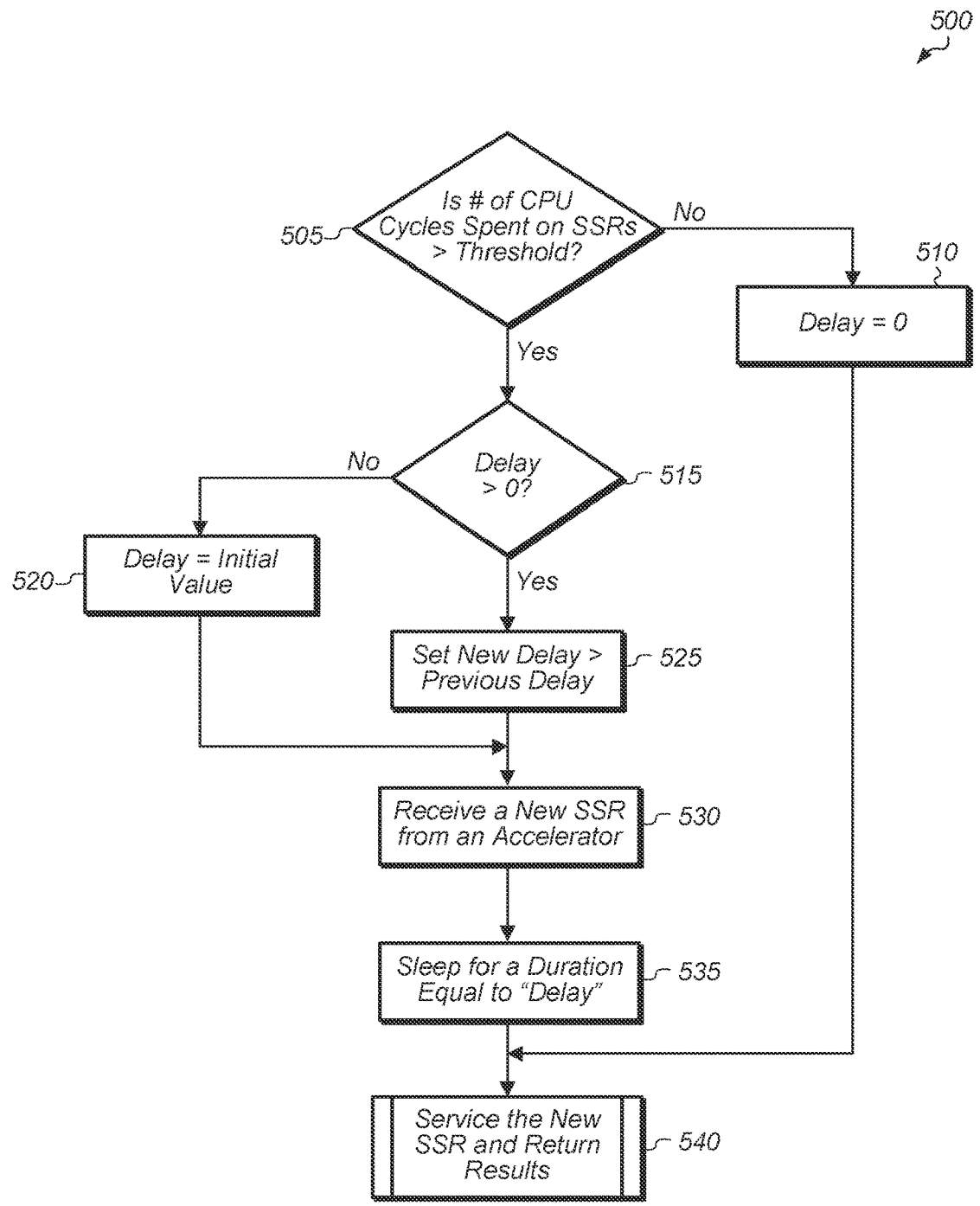
FIG. 5 is a generalized flow diagram illustrating one implementation of a method for enforcing quality of service guarantees on a CPU while processing requests from an accelerator.
Figure 6:
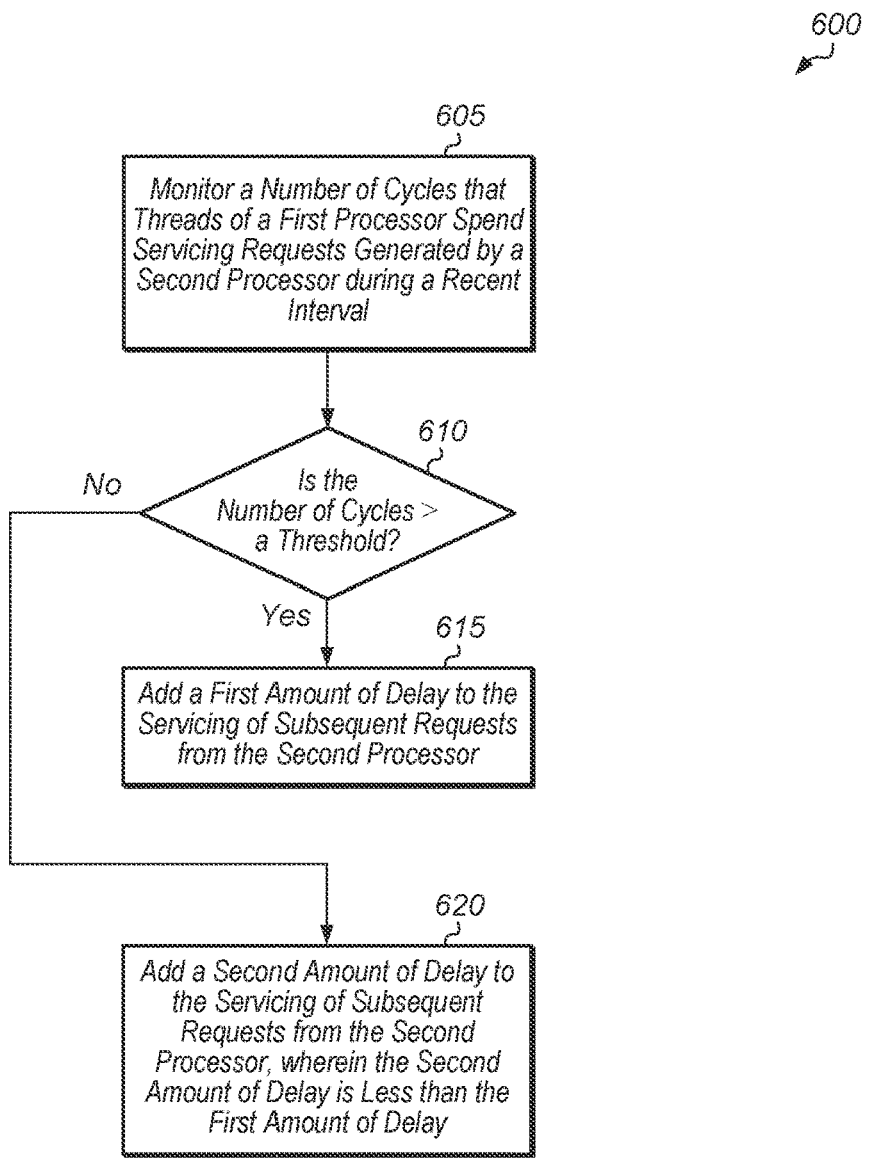
FIG. 6 is a generalized flow diagram illustrating one implementation of a method for dynamically adjusting a delay added to the servicing of requests.
Figure 7:
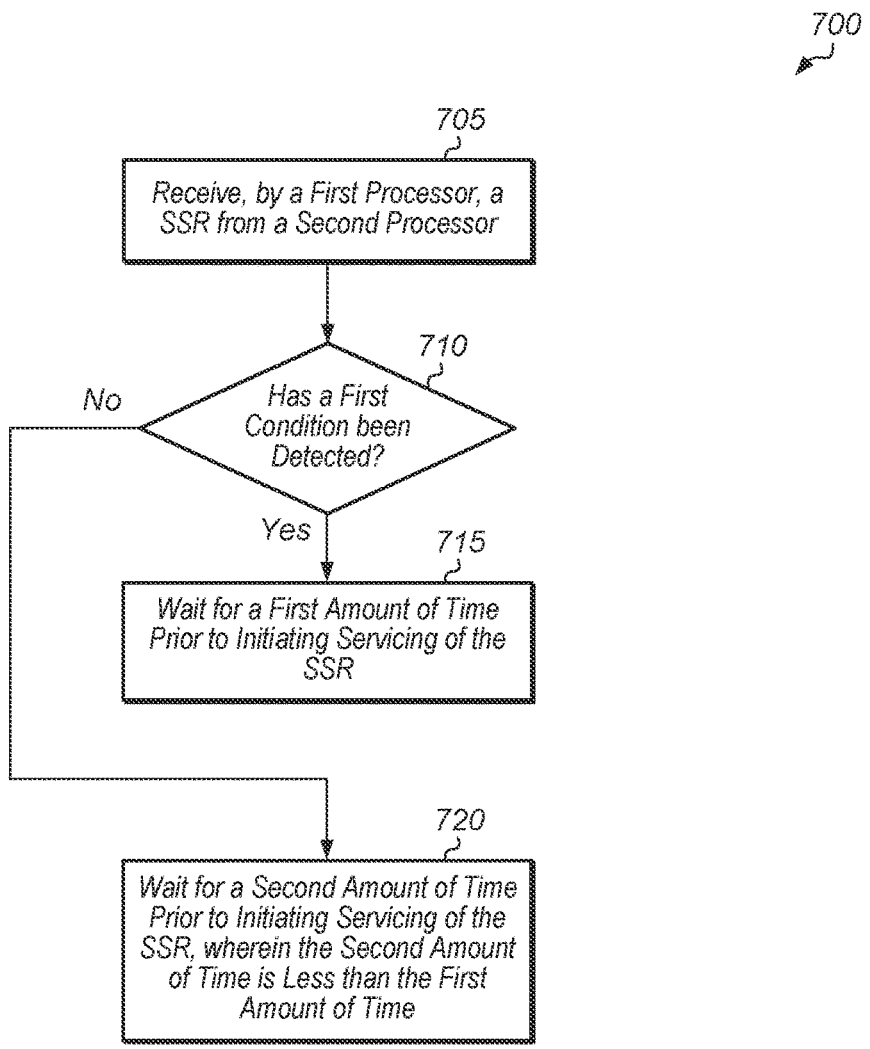
FIG. 7 is a generalized flow diagram illustrating one implementation of a method for processing system service requests (SSRs).

Referring now to FIG. 5, one implementation of a method 500 for enforcing QoS guarantees on a CPU while processing requests from an accelerator is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A CPU determines if the number of CPU cycles spent servicing system service requests (SSRs) from an accelerator is greater than a threshold (conditional block 505). It is noted that the CPU is referred to herein as a first processor and the accelerator is referred to herein as a second processor. In another implementation, the CPU tracks whether the number of CPU cycles spent servicing SSRs from multiple accelerators in conditional block 505. If the number of CPU cycles spent servicing SSRs is less than or equal to the threshold (conditional block 505, "no" leg), then the CPU sets a delay equal to zero (block 510). Otherwise, if the number of CPU cycles spent servicing SSRs is greater than the threshold (conditional block 505, "yes" leg), then the thread determines if the delay is currently greater than zero (conditional block 515).

If the delay is currently equal to zero (conditional block 515, "no" leg), then the thread sets the delay to an initial value (e.g., 10 μsec) (block 520). The initial value varies from implementation to implementation. Otherwise, if the delay is currently greater than zero (conditional block 515, "yes" leg), then the thread increases the value of the delay (block 525). Next, after blocks 520 or 525, the thread receives a new SSR from an accelerator (block 530). Prior to servicing the new SSR, the thread sleeps for a duration equal to the current value of delay (block 535). It is noted that the term "sleep" used in block 535 refers to waiting for an amount of time equal to the current value of delay before starting to service the new SSR. After sleeping for the duration equal to "delay", the thread services the new SSR and returns results to the accelerator (block 540). After block 540, method 500 ends.

Turning now to FIG. 6, one implementation of a method 600 for dynamically adjusting a delay added to the servicing of requests is shown. A first processor monitors a number of cycles that threads of the first processor spend servicing requests generated by a second processor during a previous time interval (block 605). In another implementation, rather than just monitoring the number of cycles, the first processor monitors the overhead involved in servicing requests by the second processor, with the overhead including multiple components. For example, the overhead includes the time spent actually servicing the request, indirect CPU overhead spent transitioning between user and kernel mode, time spent in user mode running at a lower IPC rate due to the kernel's use of various resources of the processor. In one implementation, the first processor is a CPU and the second processor is an accelerator (e.g., GPU). In other implementations, the first and second processors are other types of processors. The duration of the interval over which the number of cycles is counted varies from implementation to implementation.

If the number of cycles that the first processor threads spend servicing requests generated by the second processor during the previous time interval is greater than a threshold (conditional block 610, "yes" leg), then the first processor adds a first amount of delay to the servicing of subsequent requests from the second processor (block 615). Otherwise, if the number of cycles that the first processor threads spend servicing requests generated by the second processor during the previous time interval is less than or equal to the threshold (conditional block 610, "no" leg), then the first processor adds a second amount of delay to the servicing of subsequent requests from the second processor, wherein the second amount of delay is less than the first amount of delay (block 620). In some cases, the second amount of delay is zero, such that the first processor services subsequent requests immediately. After blocks 615 and 620, method 600 ends.

Referring now to FIG. 7, one implementation of a method 700 for processing system service requests (SSRs) is shown. A first processor receives a SSR from a second processor (block 705). In one implementation, the first processor is a CPU and the second processor is an accelerator (e.g., GPU). In other implementations, the first and second processors are other types of processors. In response to receiving the SSR from the second processor, the first processor determines whether a first condition has been detected (conditional block 710). In one implementation, the first condition is the overhead on the first processor for servicing SSRs from the second processor (and optionally from one or more other processors) over a previous time interval being greater than a threshold. The overhead includes cycles spent actually servicing SSRs, cycles spent transitioning between user and kernel mode before and after servicing SSRs, cycles spent in user mode running at a lower IPC rate due to degradation of microarchitectural state (e.g., consumption of processor resources such that fewer resources are available), and so on. In other implementations, the first condition is any of various other types of conditions or a combination of multiple conditions.

If the first condition has been detected (conditional block 710, "yes" leg), then the first processor waits for a first amount of time prior to initiating servicing of the SSR (block 715). Alternatively, the first processor assigns a first priority to the servicing of the SSR implementation when the first condition has been detected. If the first condition has not been detected (conditional block 710, "no" leg), then the first processor waits for a second amount of time prior to initiating servicing of the SSR, wherein the second amount of time is less than the first amount of time (block 720). In some cases, the second amount of time is zero, such that the first processor services the SSR immediately. Alternatively, in another implementation, the first processor assigns a second priority to the servicing of the SSR when the first condition has not been detected, wherein the second priority is higher than the first priority. After blocks 715 and 720, method 700 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a first processor comprising circuitry configured to execute requests of a plurality of types; and
   a second processor comprising circuitry configured to generate a request of a first type of the plurality of types; and
   wherein the first processor is configured to adjust an amount of delay that is added before servicing the request of the first type, based on a monitored amount of time that comprises time spent by the first processor executing previous requests of the first type and time spent transitioning from a user mode to a kernel mode to service the previous requests of the first type.

2. The system as recited in claim 1, wherein the amount of time spent by the first processor executing the previous requests of the first type corresponds to a defined time interval.

3. The system as recited in claim 2, wherein the first processor is configured to adjust the amount of delay by:
   increasing the amount of delay by a first amount, responsive to the amount of time spent by the first processor executing the previous requests of the first type exceeding a threshold; and
   increasing the amount of delay by a second amount different than the first amount, responsive to the amount of time spent by the first processor executing the previous requests of the first type not exceeding the threshold.

4. The system as recited in claim 3, wherein the first processor is configured to monitor the amount of time spent by the first processor executing requests of the first type.

5. The system as recited in claim 3, wherein the requests of the first type correspond to system service requests.

6. The system as recited in claim 1, wherein the amount of time spent by the first processor executing previous requests of the first type comprises cycles spent transitioning from the kernel mode to the user mode, and cycles spent in the user mode running at a lower instruction per cycle rate.

7. A method comprising:
   generating, by a first processor, a request of a first type; and
   adjusting, by a second processor configured to execute request of a plurality of types, an amount of delay that is added before servicing the request of the first type, based on a monitored amount of time that comprises time spent by the second processor executing previous requests of the first type and time spent transitioning from a user mode to a kernel mode to service the previous requests of the first type; and
   servicing, by the second processor, the request of the first type.

8. The method as recited in claim 7, wherein the amount of time spent by the second processor executing the previous requests of the first type corresponds to a defined time interval.

9. The method as recited in claim 8, wherein adjusting the amount of delay by the second processor comprises:
   increasing the amount of delay by a first amount responsive to the amount of time spent by the first processor executing the previous requests of the first type exceeding a threshold; and
   increasing the amount of delay by a second amount different than the first amount, responsive to the amount of time spent by the first processor executing the previous requests of the first type not exceeding the threshold.

10. The method as recited in claim 9, wherein the first amount is greater than the second amount.

11. The method as recited in claim 9, further comprising adjusting the threshold by an operating system responsive to operating conditions.

12. The method as recited in claim 7, wherein the amount of time spent by the first processor executing the previous requests of the first type comprises cycles spent transitioning from the kernel mode to the user mode, and cycles spent in the user mode running at a lower instruction per cycle rate.

13. An apparatus comprising:
   a memory;
   one or more execution units coupled to the memory;
   wherein the apparatus is configured to:
      generate a request of a first type of a plurality of types;
      adjust an amount of delay that is added before servicing the request of the first type, based on an amount of time that comprises time spent executing previous requests of the first type and time spent transitioning from a user mode to a kernel mode to service the previous requests of the first type; and
      service the request of the first type.

14. The apparatus as recited in claim 13, wherein the amount of time spent executing the previous requests of the first type corresponds to a defined time interval.

15. The apparatus as recited in claim 14, wherein to adjust the amount of delay, the apparatus is configured to:
   increase the amount of delay by a first amount responsive to the amount of time spent executing the previous requests of the first type exceeding a threshold; and
   increase the amount of delay by a second amount different than the first amount, responsive to the amount of time spent executing the previous requests of the first type not exceeding the threshold.

16. The apparatus as recited in claim 15, wherein the first amount is greater than the second amount.

17. The apparatus as recited in claim 15, wherein the request of the first type is a system service request.

* * * * *